(12) United States Patent
Miller

(10) Patent No.: US 7,318,604 B2
(45) Date of Patent: Jan. 15, 2008

(54) HOURGLASS AIRBAG

(75) Inventor: Ryan Miller, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 212 days.

(21) Appl. No.: 11/040,672

(22) Filed: Jan. 21, 2005

(65) Prior Publication Data

US 2005/0184499 A1 Aug. 25, 2005

Related U.S. Application Data

(60) Provisional application No. 60/538,356, filed on Jan. 22, 2004.

(51) Int. Cl.
*B60R 21/16* (2006.01)

(52) U.S. Cl. ................................. 280/743.1

(58) Field of Classification Search ............ 280/730.1, 280/728.1, 743.1
See application file for complete search history.

(56) References Cited

U.S. PATENT DOCUMENTS 6,227,568 B1 * 5/2001 Adomeit et al. ......... 280/743.1
6,536,800 B2 * 3/2003 Kumagai et al. ........ 280/743.1
6,572,144 B2 * 6/2003 Igawa .................... 280/743.1

\* cited by examiner

*Primary Examiner*—Paul N. Dickson
*Assistant Examiner*—Robert A. Coker
(74) *Attorney, Agent, or Firm*—Rankin, Hill, Porter & Clark LLP; Mark E. Duell

(57) ABSTRACT

The present invention is directed toward an vehicle airbag construction that reduces the incidence of an unrestrained passenger engaging the A-pillar during a high-speed crash. The present invention is also directed toward an airbag structure that reduces the risk of a restrained passenger's hands contacting the instrument panel. In accordance with the present invention, an airbag is formed so as to take on a generally hourglass shape when inflated. Thus, the inflated airbag of the present invention has a greater width dimension at the upper and lower ends thereof than at the middle. The enlarged width dimension at the airbag upper end prevents or minimizes contact between the passenger's head and the vehicle A-pillar. The enlarged width at the airbag lower end prevents or minimizes contact between the passenger's hands and the vehicle instrument panel.

9 Claims, 5 Drawing Sheets

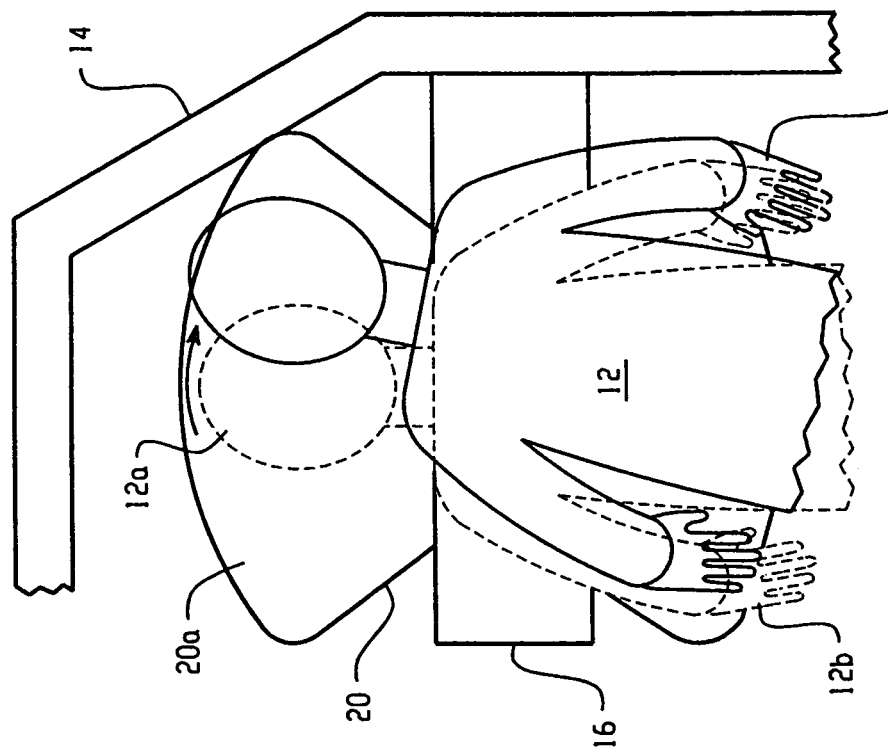
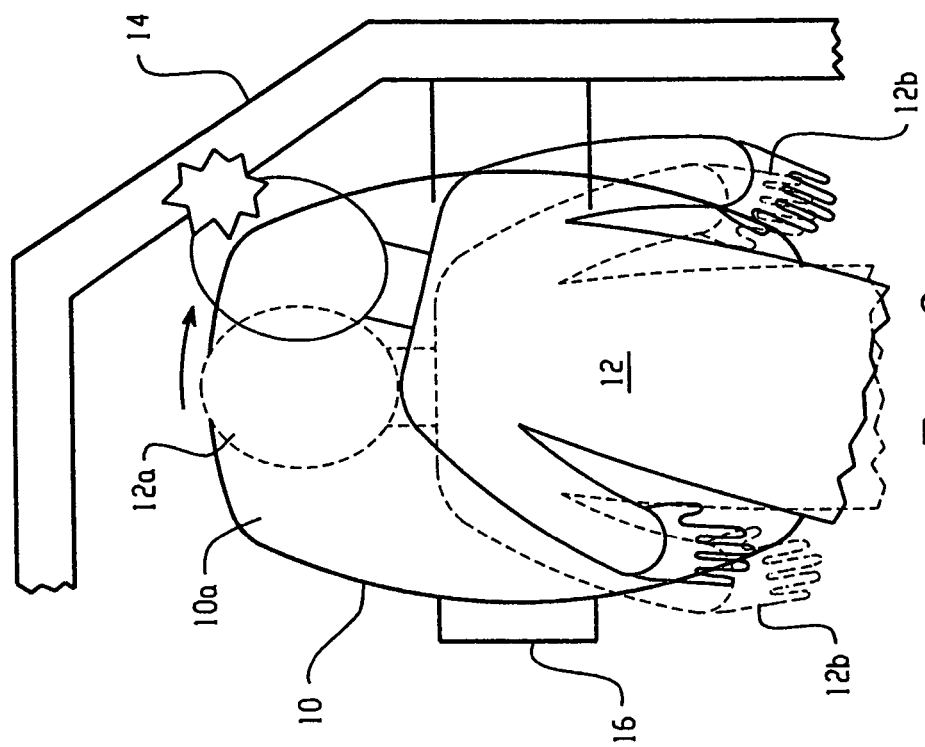
Fig. 2a PRIOR ART
Fig. 2b

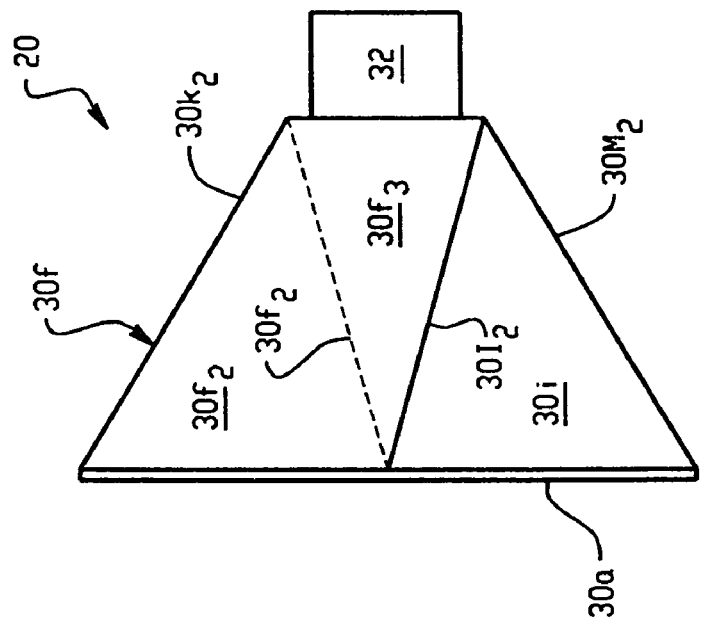
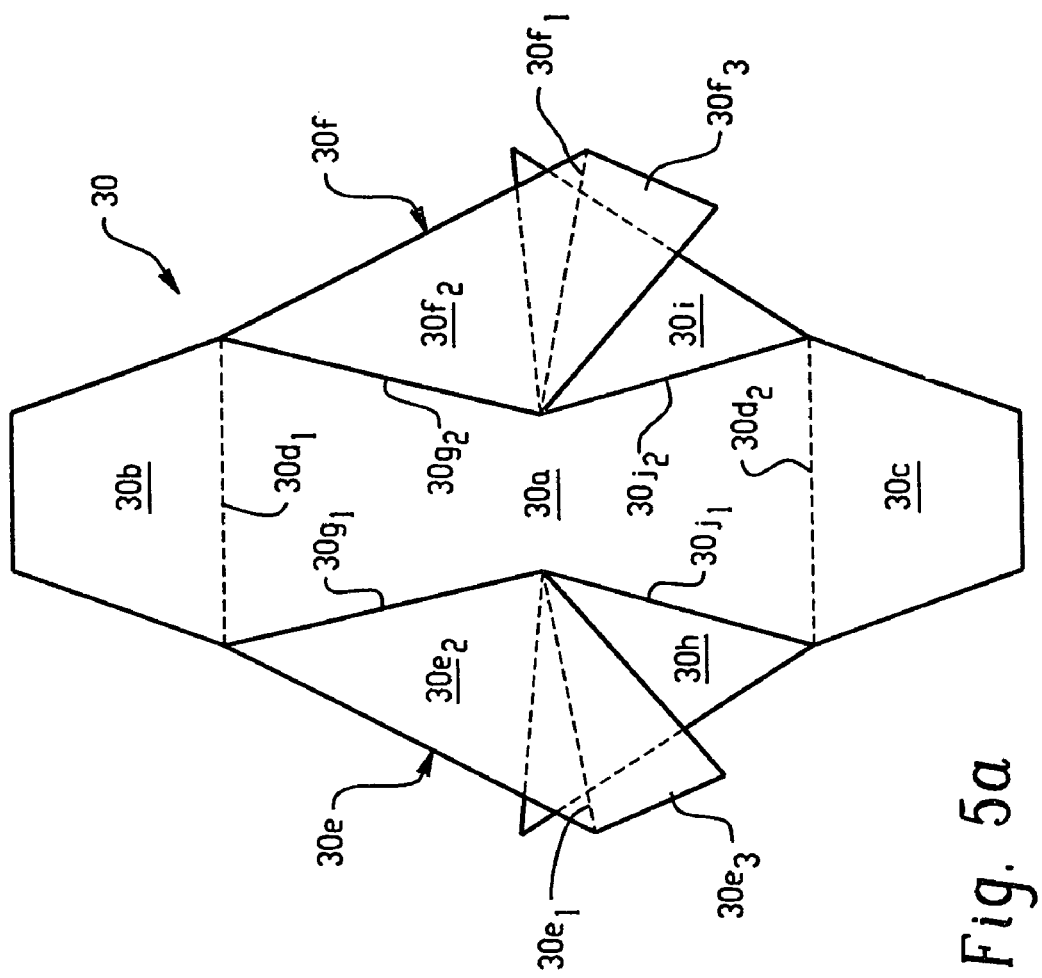

HOURGLASS AIRBAG

BACKGROUND OF THE INVENTION

1. Field of the Invention

The present invention generally relates to passenger restraint systems and, more particularly, toward an improved airbag structure.

2. Description of Related Art

Front airbags are conventionally included on both the driver side and the passenger side of the vehicle. The passenger-side airbags 10 are typically formed into a common geometric shape, such as rectangular, oval, etc, such as shown in FIG. 1a. More specifically, the passenger side airbags 10 are typically constructed so as to have a surface, when inflated, facing the passenger that is curved outwardly (convex) toward the passenger, and so as to have an upper end 10a and a lower end 10b that are somewhat narrower than a middle portion 10c of the airbag 10. As shown in the figures, such a convex airbag 10 can have a width at the upper and lower ends 10a, 10b of about 400 mm, while having a width across the middle portion 10c of about 500 mm. However, it has been found that this conventional shape may be disadvantageous in some circumstances.

For example, as shown in FIG. 2a, for a passenger 12 during a high speed impact, the head 12a of the passenger 12 would contact the top portion 10a of the airbag 10. But if the passenger 12 is unrestrained (i.e., not properly wearing a seatbelt as required by law) it may happen that, during a high speed impact, the head 12a of the unrestrained passenger may fail to contact the top portion 10a of the airbag 10. The unrestrained passenger may move to one side so that the passenger's head 12a may directly contact the vehicle's A-pillar 14. The force of the head impact is measured in "Gs" (referring to a correlated multiple of gravitational force). As shown in the graph of FIG. 4, in a collision, a head impact could produce a G spike 18a greater than 50 Gs, which can result in injury to the passenger's head 12a.

Further, as shown in FIG. 3a, for even a restrained passenger 12 (i.e., one wearing a lap belt) during a high-speed impact, the lap belt does not restrain the passenger's hands 12b. It may happen that the passenger's hands 12b would not directly contact the airbag 10, but would go around and underneath (behind) the lower end 10b of the airbag 10, and directly contact the vehicle instrument panel 16. In addition to causing injury to the hands 12b, such a hard contact can send a G spike through the shoulder and down the chest of the passenger 12, thereby contributing to the other G forces on the chest of the passenger 12 arising from, e.g., the passenger's shoulders. These additional forces can contribute to passenger injuries sustained to the chest.

Both of the aforementioned problems are undesirable and, therefore, there exists a need in the art for an improved airbag structure that eliminates or minimizes the problems experienced in the art.

SUMMARY OF THE INVENTION

The present invention is directed toward an improved airbag construction that is adapted to overcome previously-encountered problems. The present invention is further directed toward an airbag that reduces the incidence of an unrestrained passenger engaging the A-pillar during a high-speed crash. The present invention is also directed toward an airbag structure that reduces the risk of a passenger's hands contacting the instrument panel during an impact.

In accordance with the present invention, an airbag is formed so as to take on a generally hourglass shape when inflated. Thus, the inflated airbag of the present invention has a greater width dimension at the upper and lower ends thereof than at the middle. The enlarged width dimension at the airbag upper end prevents or minimizes contact between the passenger's head and the vehicle A-pillar. The enlarged width at the airbag lower end prevents or minimizes contact between the passenger's hands and the vehicle instrument panel.

BRIEF DESCRIPTION OF THE DRAWINGS

These and further features of the invention will be apparent with reference to the following description and drawings, wherein:

FIG. 2a schematically illustrates the interaction between a passenger, the conventional airbag, and the A-pillar during an unrestrained impact;

FIG. 2b schematically illustrates the interaction between a passenger, the airbag of the present invention, and the A-pillar during an unrestrained impact;

FIG. 5a is an exploded view depicting a pattern indicating the panels used in forming the airbag in accordance with the present invention.

FIG. 5b is a side view depicting the assembled airbag formed of the pattern shown in FIG. 5a, in accordance with the present invention.

DETAILED DESCRIPTION OF THE PREFERRED EMBODIMENTS

Figure 1B:
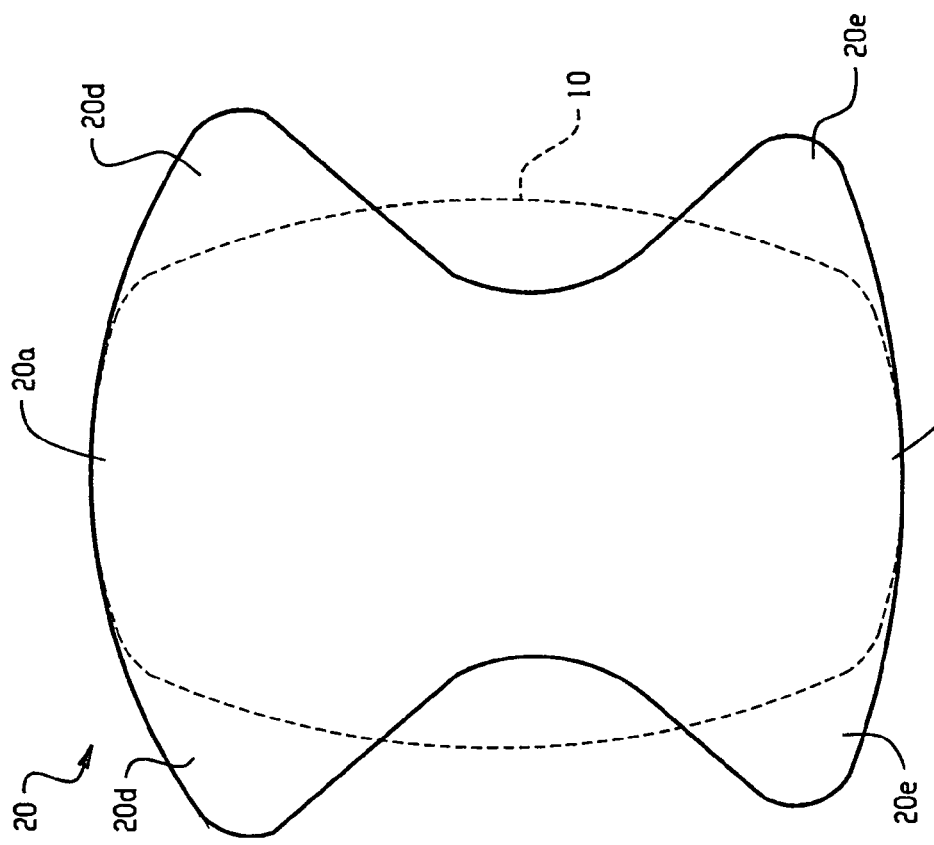
FIG. 1b is a front elevational view of the airbag according to the present invention, with the conventional airbag shown in phantom.
Figure 1A:
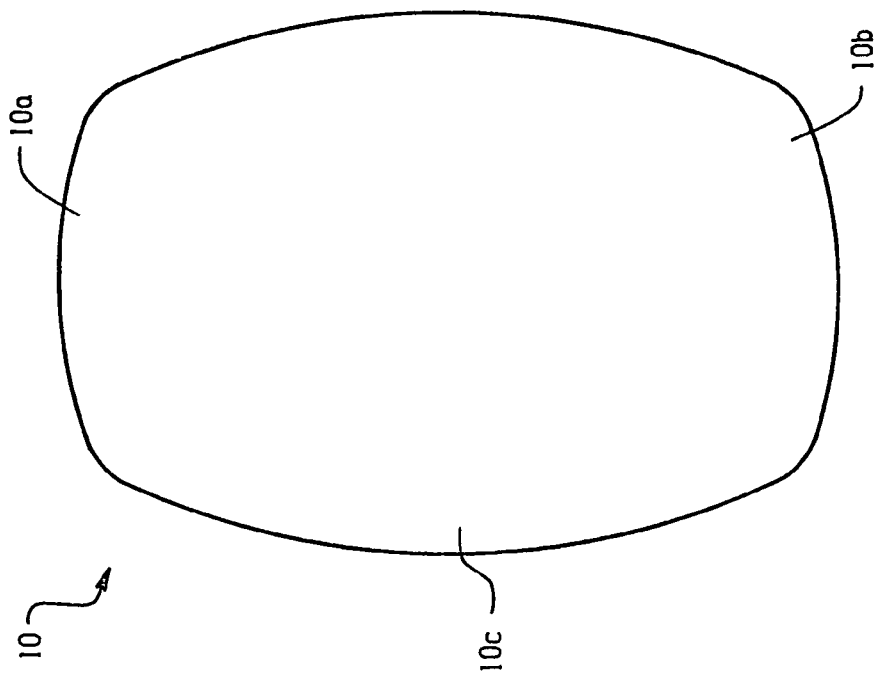
FIG. 1a is a front elevational view of a conventional airbag.

With reference to FIG. 1b, the airbag 20 of the present invention is shown to have a generally hourglass shape whereby the upper end 20a and lower end 20b of the airbag 20 have a greater width dimension than that of the middle portion of the airbag. The greater width dimension at the airbag upper end 20a serves to protect the passenger's head 12a against contacting the vehicle A-pillar 14. The greater width dimension at the airbag lower end 20b serves to protect the passenger's hands 12b from contacting the instrument panel 16.

Figure 4:
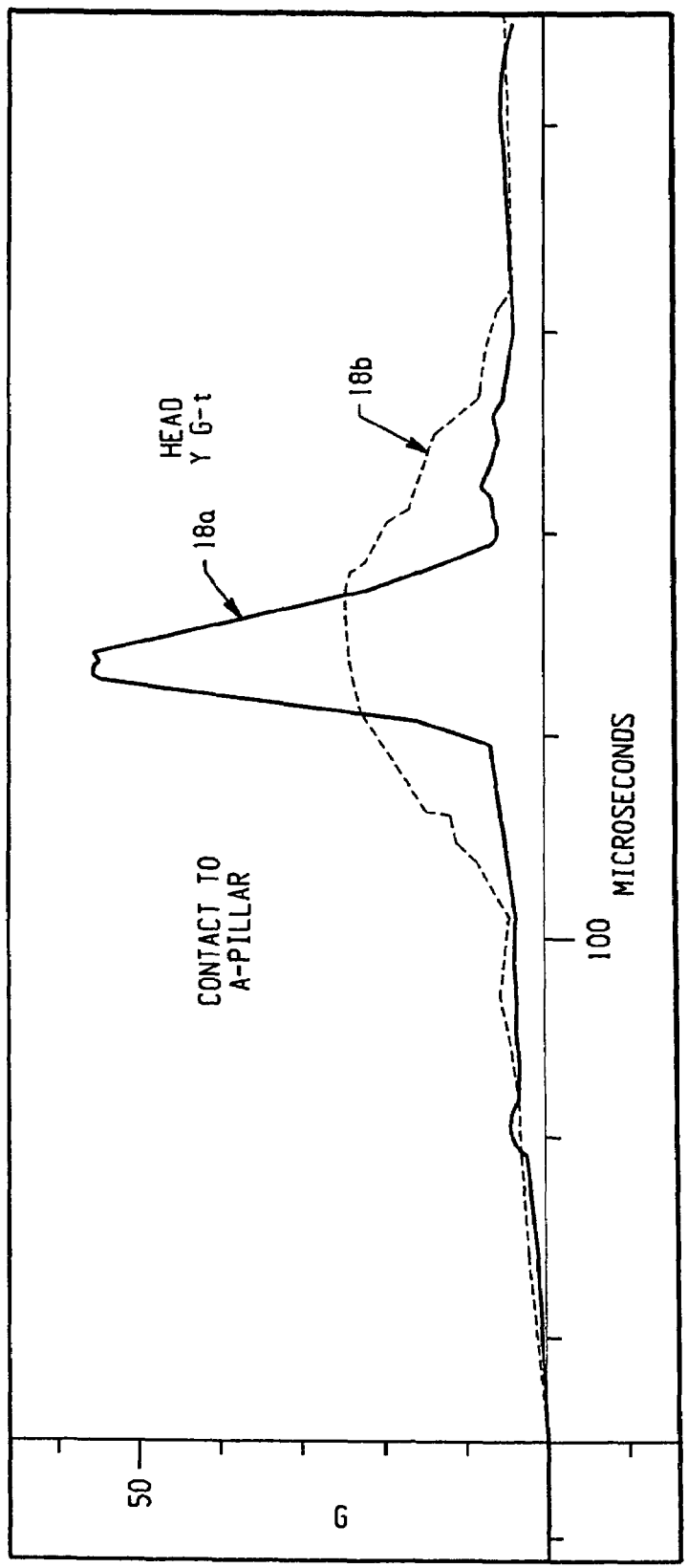
FIG. 4 is a graph comparing the forces experienced by a test dummy with a previous-type airbag and the airbag of the present invention.

With reference to FIG. 2b, it is shown that during an impact in which the front passenger 12 is not restrained (i.e., not wearing a seat belt), the passenger's head 12a is protected from directly contacting the A-pillar 14 by the enlarged or elongated width dimension of the airbag upper end 20a. As shown in the graph of FIG. 4, the head impact resulting from the present airbag 20 is greatly reduced, with a maximum G force 18b of about 20 Gs, distributed over a 100 ms (microsecond) interval. In this way, the large G spike is greatly dampened. Accordingly, by use of the inventive airbag 20 having the inflated shape illustrated in FIG. 1b, the risk of injury to the passenger 12 is reduced.

Figure 3B:
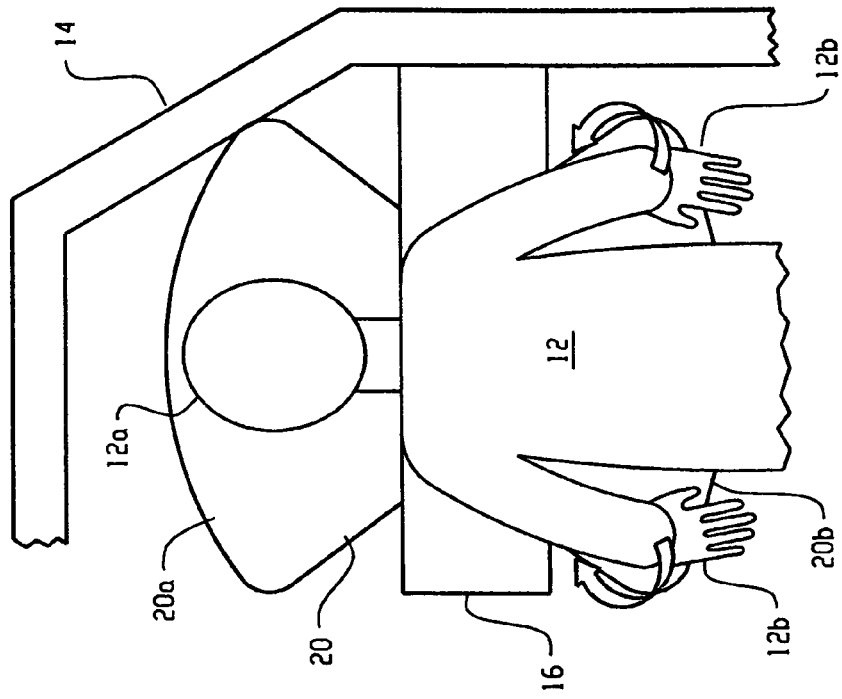
FIG. 3b schematically illustrates the interaction between a passenger, the airbag of the present invention, and the instrument panel during a restrained impact.
Figure 3A:
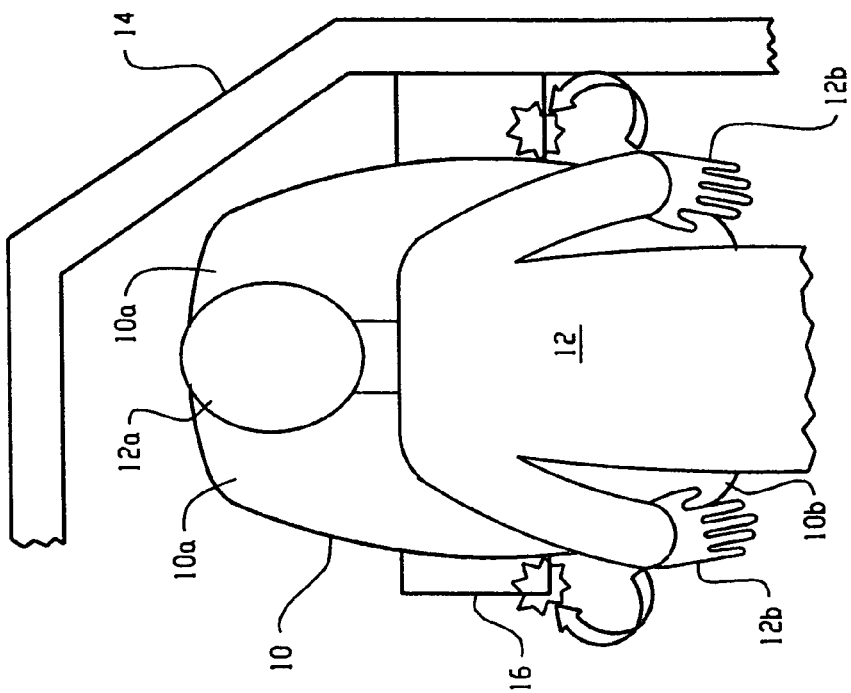
FIG. 3a schematically illustrates the interaction between a passenger, the conventional airbag, and the instrument panel during a restrained impact.

With reference to FIG. 3b, it is shown that during an impact in which the front passenger 12 is restrained (i.e., wearing a seat/lap belt), the passenger's hands 12b are protected from directly contacting the instrument panel 16 by the enlarged or elongated width dimension of the airbag lower end 20b. Accordingly, by use of the inventive airbag 20 having the shape shown in FIG. 1b, the risk of injury to the passenger 12 is reduced.

As generally indicated in FIG. 1b, the upper end 20a of the airbag has a predetermined width dimension, and the lower end 20b also has a predetermined width dimension. Preferably, the predetermined width dimensions of the upper and lower ends 20a, 20b are substantially equal. Also, these predetermined width dimensions are substantially about twice the width dimension of the middle portion 20c. In the preferred embodiment, the predetermined width dimensions of the upper and lower ends 20a, 20b are substantially about 700 mm (millimeters) and the width dimension of the middle portion 20c is substantially about 350 mm.

As shown in FIG. 1b, the sides of the upper end 20a define head impact zones 20d on either side of the airbag 20. The sides of the lower end 20b define hand impact zones 20e on either side of the airbag 20. These impact zones 20d, 20e provide principal protection to the head and hands in the event of a vehicle collision.

FIGS. 5a and 5b show the associated pattern and the assembled product for the present airbag. As indicated in FIG. 5a, the pattern 30 includes a front panel 30a, generally in an "hourglass" shape, i.e. a shape composed of two isosceles trapezoids joined at their short parallel sides. A top panel 30b and a bottom panel 30c are provided, and each is generally in the shape of an isosceles trapezoid. The top panel 30b and bottom panel 30c are joined to the front panel 30a along associated adjoining edges $30d_1$, $30d_2$ along their associated long parallel sides.

In the preferred embodiment, the front panel 30a is formed of a single piece of material with the top and bottom panels 30b, 30c, and the adjoining edges $30d_1$, $30d_2$ comprise fold lines. However, the front panel 30a and the top and bottom panels 30b, 30c may alternatively be formed of separate pieces of material and stitched and/or bonded together along these edges $30d_1$, $30d_2$, after which the stitched edges would constitute fold lines along which these panels would be folded.

The airbag pattern 30 also includes a left upper side panel 30e and a right upper side panel 30f, stitched or otherwise joined along adjoining edges $30g_1$, $30g_2$ to the top side sections of the front panel 30a. These left and right upper side panels 30e, 30f each include a fold line $30e_1$, $30f_2$ so as to result in associated triangular side sections $30e_2$, $30f_2$ and associated triangular middle sections $30d_1$, $30d_2$. The airbag pattern 30 also includes a left lower side panel 30h and a right lower side panel 30i, stitched or otherwise joined along adjoining edges $30j_1$, $30j_2$ to the bottom side sections of the front panel 30a.

As generally indicated at FIG. 5b, the left and right upper side panels 30e, 30f are stitched or otherwise joined to the top side section of the front panel 30a along adjoining edges $30l_1$, $30l_2$. The triangular middle sections $30d_1$, $30d_2$ are stitched or otherwise joined to the left and right lower side panels 30h, 30i along adjoining edges $30k_1$, $30k_2$. The left and right lower side panels 30h, 30i are stitched or otherwise joined to the bottom side section of the top panel 30a along adjoining edges $30m_1$, $30m_2$. When all the panel sections are joined as indicated in FIGS. 5a, 5b, the assembled airbag 20 is connected to an inflator 32, which inflates the airbag 20 in the event of a collision, as is well known in the art.

As described hereinabove, the present embodiments solve many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims. (The views expressed in this application are those of the inventor and do not necessarily reflect the position of the inventor's employer, the assignee, its affiliates, officers, agents or employees.)

What is claimed:

1. An airbag for use in a vehicle, comprising:

a front panel, a top panel, a bottom panel, upper side panels, and lower side panels, said front panel being joined to said top, bottom, upper side, and lower side panels and serving as a front surface of the airbag, said airbag front surface having an upper end, a middle portion, and a lower end, said upper and lower ends having a substantially equal first width dimension, said middle portion, which is disposed between said upper and lower ends, having a second width dimension, said top panel being integrally joined to said upper end of said front panel, said bottom panel being integrally joined to said lower end of said front panel, said upper side panels being joined to lateral sides of said front panel and extending between said upper end and said middle portion, said lower side panels being joined to lateral sides of said front panel and extending between said lower end and said middle portion, and wherein said airbag is constructed such that, when inflated, the first width dimension of said upper and lower ends is greater than the second width dimension of said middle portion.

2. The airbag according to claim 1, wherein said upper end is adapted to receive a passenger's head and thereby prevent direct contact between the passenger's head and an A-pillar of the vehicle.

3. The airbag according to claim 1, wherein said lower end is adapted to receive a passenger's hands and thereby prevent direct contact between the passenger's hands and an instrument panel of the vehicle.

4. The airbag according to claim 1, wherein the front panel is shaped as upper and lower isosceles trapezoids each having short and long parallel sides, said upper and lower isosceles trapezoids being joined to one another along their short parallel sides, and wherein the short parallel sides are disposed in the middle portion of the front panel.

5. The airbag according to claim 4, wherein the first width dimension is substantially about twice the second width dimension.

6. The airbag according to claim 5, wherein the first width dimension is about 700 mm and wherein the second width dimension is about 350 mm.

7. The airbag according to claim 4, wherein the top panel is shaped as an isosceles trapezoid having short and long parallel sides, and wherein the top panel is joined along its long parallel side to the long side of the front panel upper isosceles trapezoid.

8. The airbag according to claim 4, wherein the bottom panel is shaped as an isosceles trapezoid having short and long parallel sides, and wherein the bottom panel is joined along its long parallel side to the long side of the front panel lower isosceles trapezoid.

9. The airbag according to claim 7, wherein the top panel is shaped as an isosceles trapezoid having short and long parallel sides, and wherein the top panel is joined along its long parallel side to the long side of the front panel upper isosceles trapezoid.

* * * * *